(No Model.)
G. EASTMAN & W. H. WALKER.
PHOTOGRAPHIC FILM HOLDER.
No. 316,952. Patented May 5, 1885.
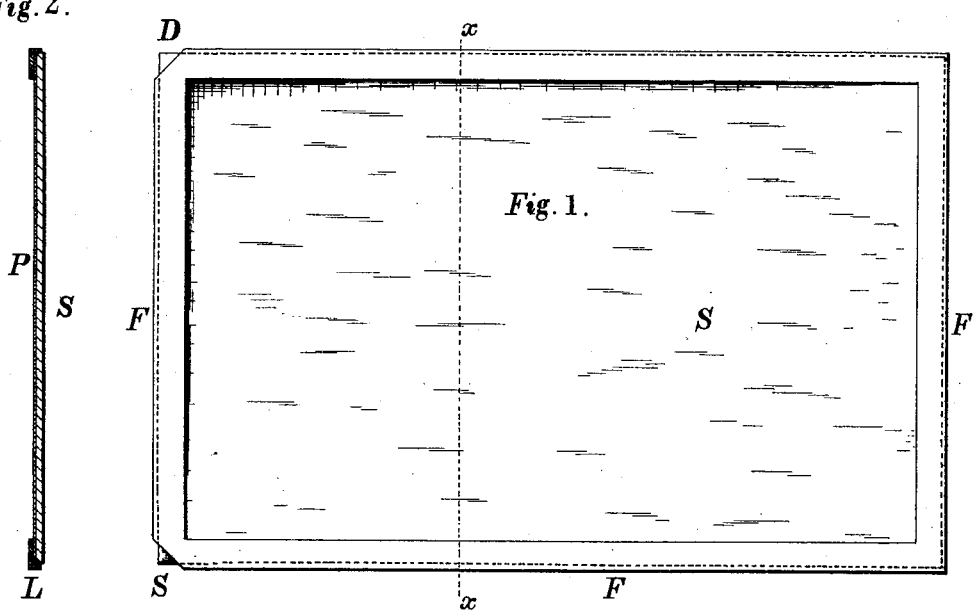
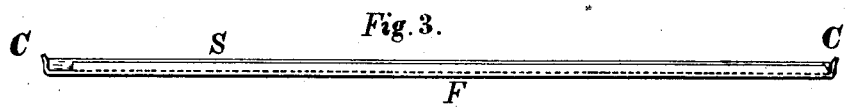
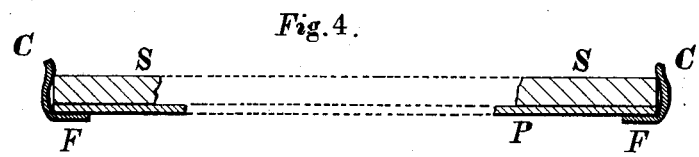
WITNESSES —
H. G. Phillips.
A. R. Selden.
INVENTORS —
George Eastman and
Wm. H. Walker,
by Geo. B. Selden.
atty —

United States Patent Office.

GEORGE EASTMAN AND WILLIAM H. WALKER, OF ROCHESTER, NEW YORK, ASSIGNORS, BY MESNE ASSIGNMENTS, TO THE EASTMAN DRY PLATE AND FILM COMPANY, OF SAME PLACE.

PHOTOGRAPHIC-FILM HOLDER.

SPECIFICATION forming part of Letters Patent No. 316,952, dated May 5, 1885.

Application filed August 8, 1884. (No model.)

*To all whom it may concern:*

Be it known that we, GEORGE EASTMAN and WILLIAM H. WALKER, citizens of the United States, residing at Rochester, Monroe county, New York, have jointly invented an Improved Potographic-Film Holder, of which the following is a specification, reference being had to the accompanying drawings.

Our present invention relates to improvements in holders or means for supporting photographic films during exposure in the camera, which improvements are fully described in the accompanying specification and drawings, and the novel features thereof specified in the claims annexed to the said specification.

In the accompanying drawings, representing our present invention, Figure 1 is a front elevation. Fig. 2 is a travsverse section on the line x x, Fig. 1. Fig. 3 is an edge view. Fig. 4 is a longitudinal section on an enlarged scale, showing the film secured in the holder.

In the accompanying drawings, representing our improved film-holder, S is a support of suitable material, corresponding in size and shape with the glass plates ordinarily used in the production of photographic negatives. This support may be of glass, hard rubber, celluloid, vulcanite, vulcanized fiber, wood, one or more thicknesses of veneer, pasteboard, press-board, metal, or other suitable material.

The frame F may be made of any suitable metal, preferably in one piece to avoid laps or joints. The center of the frame is cut out to within about one-fourth of one inch from the edge of the plate, and two of the opposite sides (preferably the longest) may be turned over, as shown at L, Fig. 2, for the purpose of stiffening the frame. The shorter sides are turned backward and bent slightly inward in such a manner as to clasp two of the opposite edges of the support when pressed down upon it.

The method of using our improved film-holder is as follows: We lay a sensitive film, cut slightly smaller than the support, chemical side upward, upon the support, then lay the frame F down upon it and press it down along the edges, so that the bent edges or clips C C of the frame clasp over the edges of the support and hold the film firmly to its face. The frame F, being thin, is found in practice not to interfere with the proper focusing of the image on the film. The holder having the film secured thereto is then exposed in the camera in any ordinary or suitable exposing-frame.

In order to facilitate the removal of the film from the holder, we cut off the corner or corners of the frame, as shown at D, Fig. 1, so as to uncover the corner of the support S.

The operator detaches the frame from the support by pressing on the corners of the latter.

We claim—

1. The herein-described photographic-film holder, consisting of the plate or support S and open frame F, provided with clips C C, adapted to fit over two opposite sides of the support and to hold the film against the face side of the support, substantially as and for the purposes set forth.

2. The herein-described photographic-film holder, consisting of the plate or support S and open frame F, having one or more truncated corners, D, and provided with clips C C, adapted to fit over two opposite sides of the support and to hold the film against the face side of the support, substantially as and for the purposes set forth.

GEORGE EASTMAN.
WM. H. WALKER.

Witnesses to signature of George Eastman:
   GEO. B. SELDEN,
   H. G. PHILLIPS.

Witnesses to signature of Wm. H. Walker:
   HENRY D. MARKS,
   SAMUEL D. WARDLAW.